Dec. 2, 1958     F. PHILIPP     2,862,641
PRESSURE CONTROL DEVICE
Filed March 7, 1956
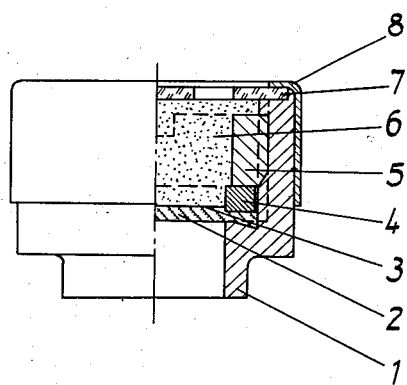
Inventor:
Fritz Philipp
By: Michael S. Striker
agt.

United States Patent Office 2,862,641
Patented Dec. 2, 1958

2,862,641

PRESSURE CONTROL DEVICE

Fritz Philipp, Hagen-Haspe, Germany, assignor to Accumulatoren-Fabrik Aktiengesellschaft, Hagen, Germany Application March 7, 1956, Serial No. 570,034

2 Claims. (Cl. 220—89)

The present invention relates to a pressure control device, and more particularly it relates to a pressure control safety device for gas-tightly sealed batteries.

In many cases it is necessary to provide pressure control devices for gas-tightly sealed containers in which an increase in pressure might occur. The pressure control device of such a gas-tightly sealed container is then actuated when a predetermined degree of over pressure is reached within the container. Thereby an increase of pressure beyond the predetermined degree is prevented and consequently also bursting of the container and any damage that otherwise might be caused by a possibly explosion-like bursting of the gas-tightly sealed container. Such safety device for control of internal pressure is of special importance in connection with gas-tightly sealed batteries in which a dangerous over pressure could be caused by improper operation thereof which in extreme cases may lead to the bursting of the battery housing.

It is an object of the present invention to provide an effective pressure control device.

It is another object of the present invention to provide a pressure control device which is especially suitable for use in connection with gas-tightly closed batteries.

It is still another object of the present invention to provide a pressure control device which upon visual inspection will clearly indicate whether or not the same has been actuated.

It is yet another object of the present invention to provide a pressure control device which when actuated by a predetermined degree of over pressure will cause release of the same and also will reduce the sound caused by such release of over pressure.

Other objects and advantages of the present invention will become apparent from a further reading of the description and the appended claims.

With the above objects in view, the present invention mainly consists in a pressure control device comprising, in combination, a hollow housing having a pair of opposite open ends communicating with the hollow interior thereof; a resilient membrane of predetermined thickness and resiliency located in the housing between the ends thereof, a frangible membrane having a thickness less than the predetermined thickness and a resiliency less than the predetermined resiliency superimposed upon the resilient membrane, the frangible membrane being formed of a material possessing a hardness greater than the hardness of the material of which the resilient membrane is formed, said superimposed resilient membrane and frangible membrane extending across the interior of said housing and dividing the housing into a pair of chambers fluid-tightly sealed from each other by said superimposed membranes and respectively communicating with the open ends of the housing, so that when a predetermined pressure differential acts on the superimposed membranes the same will bulge from one of the chambers into the other of the chambers, the thickness and resiliency of said membranes being so chosen that when a pressure differential greater than said predetermined pressure differential acts on the superimposed membranes the same will tear and provide communication between the chambers.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawing, in which:

The figure shows an elevational view, partly in cross section, of a pressure control device according to the present invention.

Referring now to the drawing, a hollow housing 1 is shown partly in cross section. Housing 1 is adapted to communicate at one end portion with the interior of a container such as for instance a fluid-tightly sealed battery. A silient soft membrane 2 and a frangible harder and thinner membrane 3, superimposed upon membrane 2 are jointly fixed to housing 1 by means of slip ring 4 and annular screw plug 5. Membranes 2 and 3 extend across the interior of housing 1 and divide the same into two chambers one of which is adapted to communicate with the interior of a container in which pressure may be built up, and one of which located on the other side of membranes 2 and 3 communicates with the outer atmosphere. A preferably transparent plate 7 extends across the free end portion of the chamber communicating with the outer atmosphere. Plate 7 is formed with at least one perforation through which communication between the adjacent chamber and the outer atmosphere is maintained. Annular cap 8 is superimposed over peripheral portions of plate 7 and portions of the outer side walls of housing 1 in order to prevent outward movement of plate 7.

Upon increase of pressure in the container communicating with one of the chambers, the resilient, relatively soft membrane 2 facing into said chamber and airtightly sealing the same against the other chamber, will bulge into the other chamber and thereby will also cause bulging of the frangible, harder and thinner membrane 3 which is superimposed upon membrane 2 and faces into the other chamber which communicates with the outer atmosphere. When the pressure in the container is increased above a predetermined degree, superimposed membranes 2 and 3 will be torn and the over pressure in the container will be relieved by the flow of fluid from the container through the two chambers of the hollow housing into the outer atmosphere.

Bulging of membrane 2 which for instance may be formed of soft rubber, is first limited by superimposed membrane 3 which may be formed of a suitable synthetic plastic material or the like. However when the over pressure acting on membrane 2 exceeds a predetermined degree, membrane 3 can no longer withstand the bulging pressure of membrane 2 and simultaneous bursting or tearing of both membranes 2 and 3 occurs.

According to a preferred embodiment of the present invention either membrane 2 or membrane 3 is formed with a small bore or a slit therethrough in which case the degree of pressure which will cause bursting of the two membranes is controlled not only by the thickness and resiliency of each of the two membranes but also by the bore or slit in one of them.

An air-tightly closed battery usually contains an alkaline liquid such as an aqueous solution of potassium hydroxide. When in such air-tight battery provided with the pressure control device of the present invention, pressure is built-up due to the formation of gas, and such pressure reaches the volume at which membranes 2 and 3 are torn, gas will escape from the battery through the hollow housing 1 to the outer atmosphere. The escaping gas will carry along portions of the alkaline liquid from the battery. Frequently, considerable noise is created by the escaping gas. In order to reduce the noise accompanying actuating of the pressure control device of the present invention, sound absorbing means 6 are provided, according to a preferred embodiment of the present invention, which loosely fill the chamber in hollow housing 1 which communicates with the outer atmosphere. Sound absorbing means 6 preferably consist of a haphazardly arranged fibrous material such as a cotton wad, asbestos wad or the like. Perforations in plate 7 are sufficiently small so as not to allow the sound absorbing material 6 to be pushed out of the hollow housing by the escaping gas.

According to another preferred embodiment of the present invention, the sound absorbing means 6 are impregnated with an indicator substance adapted to change its color upon coming in contact with the escaping fluid. In the case of gas-tightly sealed alkaline batteries, the sound absorbing means may for instance be impregnated with litmus or phenolphthalein as indicator substance.

It will be understood that each of the elements described above, or two or more together, may also find a useful application in other types of pressure control devices differing from the types described above.

While the invention has been illustrated and described as embodied in a pressure control device for gas-tightly sealed batteries, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A pressure control device comprising, in combination, a hollow housing having two end portions and adapted to communicate at one end portion with the interior of a container adapted to having a fluid under pressure therein, the other end portion of said housing communicating with the outer atmosphere; a resilient membrane of predetermined thickness and resiliency located in said housing between the ends thereof; a frangible membrane having a thickness less than said predetermined thickness and a resiliency less than said predetermined resiliency superimposed upon said resilient membrane, said frangible membrane being formed of a material possessing a hardness greater than the hardness of the material of which said resilient membrane is formed, said superimposed resilient membrane and frangible membrane both fixed to and extending across the interior of said housing and dividing the same into a first chamber including said one end portion and a second chamber including said other end portion, said resilient membrane facing said first chamber and said frangible membrane facing said second chamber, said membranes being adapted upon application of a predetermined pressure in said first chamber to bulge from said first chamber into said second chamber, and to tear upon application of a pressure greater than said predetermined pressure in said first chamber, thus permitting fluid to escape through said other end portion of said housing to the atmosphere; and sound absorbing means including a haphazardly arranged fibrous material located in said second chamber for reducing the sound produced by said fluid escaping from said container, said fibrous material containing an indicator substance adapted to change its color upon contact with said escaping fluid.

2. A pressure control safety device for gas-tightly sealed batteries comprising, in combination, a hollow housing having two end portions and adapted to communicate at one end portion with the interior of a container adapted to having a fluid under pressure therein, the other end portion of said housing communicating with the outer atmosphere; a resilient membrane of predetermined thickness and resiliency located in said housing between the ends thereof; a frangible membrane having a thickness less than said predetermined thickness and a resiliency less than said predetermined resiliency superimposed upon said resilient membrane, said frangible membrane being formed with a slit therethrough and of a material possessing a hardness greater than the hardness of the material of which said resilient membrane is formed, said resilient membrane and said frangible membrane both fixed to and extending across the interior of said housing and dividing the same into a first chamber including said one end portion and a second chamber including said other end portion, said resilient membrane facing said first chamber and said frangible membrane facing said second chamber, said membranes being adapted upon application of a predetermined pressure in said first chamber to bulge from said first chamber into said second chamber, and to tear upon application of a pressure greater than said predetermined pressure in said first chamber, thus permitting fluid to escape through said other end portion of said housing to the atmosphere; and sound absorbing means including a haphazardly arranged fibrous material located in said second chamber for reducing the sound produced by said fluid escaping from said container, said fibrous material containing an indicator substance adapted to change its color upon contact with said escaping fluid.

References Cited in the file of this patent

UNITED STATES PATENTS

| | | |
|---|---|---|
| 2,233,804 | Bourne | Mar. 4, 1941 |
| 2,499,018 | Christiano | Feb. 28, 1950 |
| 2,523,068 | Simpson | Sept. 19, 1950 |
| 2,548,744 | Simms | Apr. 10, 1951 |
| 2,576,431 | White | Nov. 27, 1951 |
| 2,758,749 | Jones | Aug. 14, 1956 |

FOREIGN PATENTS

| | | |
|---|---|---|
| 808,634 | France | Nov. 14, 1936 |